United States Patent [19]

Klein

[11] 4,369,116
[45] Jan. 18, 1983

[54] LIQUID FILTRATION METHOD

[76] Inventor: Max Klein, 257 Riveredge Rd., Tinton Falls, N.J. 07724

[21] Appl. No.: 130,413

[22] Filed: Mar. 14, 1980

Related U.S. Application Data

[63] Continuation-in-part of Ser. No. 833,644, Sep. 15, 1977, Pat. No. 4,207,378, which is a continuation-in-part of Ser. No. 342,535, Mar. 16, 1973, abandoned.

[51] Int. Cl.$^3$ ............................................. B01D 37/02
[52] U.S. Cl. .................................. 210/778; 210/503; 428/402
[58] Field of Search ............. 210/777, 778, 502, 503, 210/496, 504; 423/402, 357, 407, 241, 523; 428/402; 260/2.5 B; 521/918; 131/275; 264/54

[56] References Cited

U.S. PATENT DOCUMENTS

| | | | |
|---|---|---|---|
| 2,770,241 | 11/1956 | Winkler | 131/265 |
| 2,961,710 | 11/1960 | Stark | 264/54 |
| 3,429,655 | 2/1969 | Case | 423/241 |
| 3,538,020 | 11/1970 | Heskett et al. | 210/496 |
| 3,557,955 | 1/1971 | Hirs et al. | 210/778 |
| 3,630,820 | 12/1971 | Leach | 428/402 |
| 3,658,184 | 4/1972 | Davis et al. | 210/504 |
| 3,905,910 | 9/1975 | Coombs et al. | 252/259.5 |
| 4,028,255 | 6/1977 | Bolto et al. | 210/778 |
| 4,145,284 | 3/1979 | Neu | 210/778 |

Primary Examiner—Frank Sever
Attorney, Agent, or Firm—Dann, Dorfman, Herrell and Skillman

[57] ABSTRACT

A method is provided which comprises, adding to the liquid a filtering aid effective amount of a filter aid material consisting essentially of particulate expanded polymer formed by comminuting polymeric foam to eliminate substantially all closed cells of said foam and grading to a desired average particle size range smaller than 100 mesh and larger than about 700 mesh, and filtering the resulting liquid mixture through a filter medium.

14 Claims, No Drawings

LIQUID FILTRATION METHOD

This application is a continuation-in-part of my copending patent application Ser. No. 833,644 filed Sept. 15, 1977 now U.S. Pat. No. 4,207,378, as a continuation-in-part application of its then copending prior application Ser. No. 342,535 filed Mar. 16, 1973, now abandoned.

This invention is that of a method of filtering finely divided material from a liquid having such material dispersed in it, by admixing in that liquid with the material dispersed in it, an effectively suitable amount of a filter aid material that is a particulate expanded polymer obtained by comminuting a polymer foam, such as an expanded polymer, to eliminate substantially all of the closed cells (that is, of its initial foam or expanded state before comminution) and grading the particulate expanded polymer to a desired average particle size for the contemplated filtration, such as in a range from smaller than 100 mesh to larger than about 700 mesh, and then filtering the resulting liquid mixture through a filter medium, for example, a filter cloth.

Particularly applicable as the particulate expanded polymer are the micro-bits of an expanded thermoplastic polymer non-brittle in its expanded form and selected from a styrene-polymer, a polyolefin which is a polymer member of the group of olefin homologs from ethylene to a methylpentene and having from 2 to about 5 carbons in its chain.

One way of overcoming the long-standing problem of removing from liquids finely divided insoluble materials dispersed in them was by filtration by passing such liquid under pressure through a filter medium. That method was too inefficient and expensive for handling large amounts of liquid if the pores of the filter medium were too small. Coarser filters, such as the more or less rapid filters required a pre-treatment of the liquid to be filtered to agglomerate the insoluble materials or needed admixture of a filter aid material.

As such pre-treatment is too expensive except on a large scale, the leaning has been to use a filter aid in filtration. That involved usually admixing a relatively small amount of finely divided particulate material in the liquid to be filtered so that a porous deposit of the filter aid material builds up on the filter medium surface and entraps the insoluble materials from the liquid, as the pores in the filter cake deposit of the filter aid are smaller than the pores in the filter medium.

Many of the heretofore most generally used filter aid materials, such as diatomaceous silica, perlite and fibrous materials as cellulose and asbestos, have been unsuitable for certain applications. For example, diatomaceous silica and perlite are unsuitable for filtering caustic or acid liquids, and ineffective to enable recovering the filtered out solids by burning the filter cake, because diatomaceous silica and perlite leave a residue that then has to be separated somehow from the recovered solid materials.

Those disadvantages are overcome by the method of this invention including use of its particular filter aid material.

Considered broadly, the invention involves the method of filtering finely divided material from a liquid wherein such material is dispersed, by admixing into the liquid containing the dispersed material a filtration effectively suitable amount of a filter aid material which is a particulate expanded polymer obtained by comminuting polymer foam to eliminate substantially all of its closed cells and grading the comminuted polymeric foam to a desired average particle size grade smaller than 100 mesh and larger than about 700 mesh, and filtering the resulting liquid mixtures through a suitable filter medium.

A specific embodiment of the invention is its just foregoing method wherein the polymeric foam is that of waste polymeric foam material.

The polymeric foam applicable in the method of the invention is in the form of micro-bits of an expanded thermoplastic polymer non-brittle in its expanded form and exemplified as selected from (i) a styrene-polymer, (ii) a polyolefin which is a polymer member of the group of olefin homologs from ethylene to a methylpentene and having from 2 to about 5 carbons in the chain, (iii) a melt alloy of polyethylene with about ten percent by weight of polystyrene, (iv) a copolymer of polypropylene with from about 20 to about 30 percent of polyethylene by weight, and (v) a melt alloy of polypropylene in an amount exceeding 50 percent by weight of said alloy and a copolymer of polyethylene and polyvinyl acetate to the extent of up to about 30 percent, which expanded polymer is characterized by being in the form of micro-bits (a) from about 40 to about 325 microns long and from about 20 to about 325 microns wide, (b) from substantially completely to entirely completely free of intact cells of the starting expanded polymer bit-pieces from which said micro-bits were produced, (c) substantially without any uniformity in outline of the individual micro-bit particles, and (d) in density from about 85 percent of, to about substantially the same as, the specific unexpanded polymer from which there was provided the aforesaid starting expanded polymer.

The foregoing micro-bits of the expanded styrene-polymer or expanded polyolefin are more fully described in my allowed copending application Ser. No. 833,644 (patent on which is expected to issue in April 1980) page 1 line 3 to page 3 line 21 and page 4 line 18 to page 5 line 28. The preparation of those micro-bits is described in that application Ser. No. 833,644 page 3 line 22 to page 4 line 17 and page 6 line 6 to page 9 line 7 and Examples 1 and 2 to page 15 line 21 and page 16 line 3 to page 20 line 22. These just above-identified portions of application Ser. No. 833,644 are incorporated herein by reference as if they appear written out in full herein.

The method of this invention is variously applicable as seen in the filtering and improving of liquids. That is done, for example, by admixing a filtration effective amount of particulate polymer foam such as any of the styrene-polymer or polyolefin micro-bits into the liquid containing material to be removed by filtration and then passing the resulting mixture through a filter medium, e.g., a filter cloth or filter paper or even through a bed of any of these expanded polymer micro-bits.

Illustrating more specifically, 473.2 cubic centimeters (i.e. cc.) of tap water in Matawan, N.J., was filtered through a Whatman No. 2 filter paper into a clean 946.3 cc. Mason jar which then was tightly sealed. Then 0.4 grams of the expanded polystyrene micro-bits were wetted with about 20 cc. of the Matawan tap water and admixed with about 473.2 cc. more of the tap water and then filtered through another Whatman No. 2 filter paper into a similar second clean, 946.3 cc. Mason jar and tightly sealed.

A week later a slight yellow haze was noted in the first jar, but the water (which had been admixed with the expanded polystyrene micro-bits) in the second jar still was perfectly clear. The yellow haze in the first jar increased in amount and in density with later settling to the bottom of the jar during observation over a period of three months. Yet the water that had been filtered through the polystyrene micro-bits into the second jar still was perfectly clear.

This example thus shows that the particulate polymer foam, such as the expanded polystyrene micro-bits, serves also to remove apparently invisible dissolved material as well as even possibly invisible suspended organic material from the water and thereby leaving it free from otherwise growth prone organic material even after long standing.

The expanded polystyrene micro-bits used in the foregoing filtration example can be replaced in part or as a whole by micro-bits of any other expanded styrene-polymer (as described in application Ser. No. 833,644 page 2 line 3 to page 3 line 8) and of any of the expanded polyolefins (identified earlier above) and then on repeating all of the steps included in, and following the filtration, in the foregoing example each such resulting other example provides filtration results correspondingly similar to those as obtained in that earlier example. These respective corresponding additional examples are to be considered as if presented herein in completely written out form, to avoid making this specification prolix.

The resulting filter cake of the particulate polymer foam, e.g., of any of the expanded styrene-polymer micro-bits and also of any of the expanded polyolefin micro-bits burns without leaving any residue other than that of any non-combustible material removed from the filtered liquid and thus held inter-mixed in the filtered out polymer residue. If such non-combustible material is desired, e.g., for re-use or its value, it can be recovered by burning the filter cake containing that material.

While the invention has been explained by the detailed description of certain specific embodiments of it, it is understood that various modifications and substitutions may be made within the scope of the appended claims which are intended also to cover equivalents of these embodiments.

What is claimed is:

1. A method of filtering a liquid, which method comprises adding to the liquid a filtering aid effective amount of a filter aid material consisting essentially of particulate expanded polymer formed by comminuting polymeric foam to eliminate substantially all closed cells of said foam and grading to a desired average particle size range smaller than 100 mesh and larger than about 700 mesh, and filtering the resulting liquid mixture through a filter medium.

2. The method as claimed in claim 1, wherein said polymeric foam is a waste foam material.

3. A method of filtering a liquid containing material to be filtered out therefrom, which method comprises admixing in that liquid a filtering aid effective amount of a filter aid material which is an expanded, thermoplastic, non-brittle in its said expanded form polymer selected from
   (i) a styrene-polymer,
   (ii) a polyolefin which is a polymer member of the group of olefin homologs from ethylene to a methylpentene and having from 2 to about 5 carbons in the chain,
   (iii) a melt alloy of polyethylene with about ten percent by weight of polystyrene,
   (iv) a copolymer of polypropylene with from about 20 to about 30 percent of polyethylene by weight, and
   (v) a melt alloy of polypropylene in an amount exceeding 50 percent by weight of said alloy and a copolymer of polyethylene and polyvinyl acetate to the extent of up to about 30 percent, and
which expanded polymer is in the form of micro-bits (a) from about 40 to about 325 microns long and from about 20 to about 325 microns wide, (b) from substantially completely to entirely completely free of intact cells of the starting expanded polymer bit-pieces from which said micro-bits were produced, (c) substantially without any uniformity in outline of the individual micro-bits particles, and (d) in density from about 85 percent of, to about substantially the same as, the specific unexpanded polymer from which there was provided the aforesaid starting expanded polymer.

4. The method as claimed in claim 3, wherein the said micro-bits are those of a styrene-polymer.

5. The method as claimed in claim 4, wherein the said micro-bits are those of polystyrene.

6. The method as claimed in claim 3, wherein the said micro-bits are those of a polyolefin.

7. The method as claimed in claim 6, wherein the said micro-bits are those of a polyethylene.

8. The method as claimed in claim 6, wherein the said micro-bits are those of a polypropylene.

9. A method of filtering a liquid, which method comprises adding to the liquid a filtering aid effective amount of a filter aid material consisting essentially of particulate expanded polymer formed by comminuting polymeric foam to eliminate substantially all closed cells of said foam and providing a desired average particle size range smaller than about 45 mesh and larger than about 625 mesh, and filtering the results liquid mixture through a filter medium.

10. The method as claimed in claim 9, wherein said polymer is a styrene-polymer.

11. The method as claimed in claim 10, wherein said styrene-polymer is polystyrene.

12. The method as claimed in claim 9, wherein said polymer is a polyolefin.

13. The method as claimed in claim 12, wherein said polyolefin is polyethylene.

14. The method as claimed in claim 12, wherein said polyolefin is polypropylene.

* * * * *